United States Patent Office 3,642,960
Patented Feb. 15, 1972

3,642,960
METHOD OF PRODUCING THIONO- OR DITHIO-PHOSPHONIC ACID ESTERS
Harold M. Pitt, Lafayette, and Raymond A. Simone, Walnut Creek, Calif., assignors to Stauffer Chemical Company, New York, N.Y.
No Drawing. Filed Jan. 27, 1969, Ser. No. 794,387
Int. Cl. C07f 9/40, 9/42
U.S. Cl. 260—985   5 Claims

ABSTRACT OF THE DISCLOSURE

A mono- or dithio-phosphonic acid ester such as, e.g., O-ethyl-S-phenyl ethylphosphonodithioate, is prepared by isomerization of a trialkyl phosphite in presence of an iodine containing catalyst at 185° C. and pressures between about 12 and about 30 p.s.i.g. The corresponding dialkyl alkyl phosphonate is reacted with phosgene at a temperature between about 45° and about 55° C. and a pressure between about 0 and about 80 p.s.i.g. The dialkyl phosphono chloridate formed is then reacted with a metal phenolate at about 15° C. with a pH controlled at about 12.5. Finally the phosphonic acid ester is reacted with phosphorous pentasulfide in the presence of a promoter between about 90° and 130° C. The reaction of the dialkyl alkyl phosphonate with phosgene is carried out with a promoter if elevated pressures are not used. Washing of the dialkyl phosphono chloridate to remove any nucleophilic materials prevents unwanted side reactions from occurring.

---

The present invention relates to the production of pesticidal thiono- and dithio-phosphonic acid esters.

The pesticidal esters which are produced in accordance with the process of the present invention are represented by the formula:

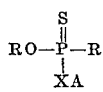

wherein R represents a lower alkyl of from 1 to 6 carbon atoms, straight or branched chain, X is oxygen or sulfur, and A is phenyl or substituted phenyl wherein the substituents are selected from the group consisting of chlorine, lower alkyl, lower alkoxy, nitro and cyano. The process of the present invention is particularly useful for producing esters such as are described in U.S. Pats. 2,988,-474, 3,149,143, 3,253,061 and 3,361,855. Examples of such esters include: O-ethyl - S - phenyl-ethylphosphonodithioate, O - ethyl - S - p - tolyl-ethylphosphonodithioate, O-ethyl - S - o - tolyl - ethylphosphonodithioate, O-ethyl-S - (p - tert. - butylphenyl) - ethylphosphonodithioate, O - ethyl-O-(3,4-dichlorophenyl)methylphosphonothioate, methylthionophosphonic acid - O - methyl - O - p - nitrophenol ester and O-ethyl-2,4,5-trichlorophenyl ethylphosphonothioate.

One aspect of this invention involves a preferred combination of process steps which produces a desired product material. In this aspect, trialkyl phosphite is isomerized in the presence of an iodine containing catalytic material to make the corresponding dialkyl alkyl phosphonate, the phosphonate is then reacted with phosgene to make the corresponding dialkyl phosphono chloridate along with $CO_2$ and alkyl chloride. This chloridate is then reacted with the suitable alkali metal salt of phenol, thiophenol or substituted derivatives thereof under condensation conditions to produce the desired phosphonic acid ester containing the

moiety. This moiety is converted to

by reaction of the phosphonic acid ester under suitable thionation conditions to produce the corresponding thiono- or dithio-phosphonic acid ester. These reactions are depicted below in general terms:

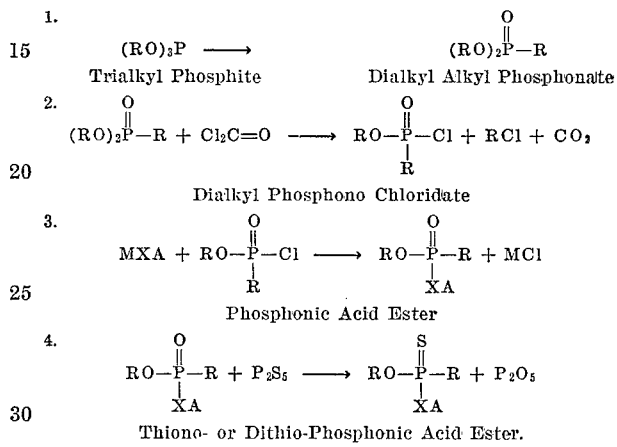

wherein R, X and A are as herein before defined and R is preferably 1 to 4 carbon atoms and M is alkali metal, preferably Na or K; X is oxygen or sulfur.

Referring to the isomerization step, trialkyl phosphite is reacted in the presence of a suitable iodine containing catalyst including alkyl iodide and iodine in amounts sufficient to effect the reacton, preferably from about 0.5 to about 4 weight percent. This reaction takes place at a temperature of between about 175° and about 210° C. but preferably between about 195° C. and about 205° C. and at a pressure of between about 10 p.s.i.g. and about 60 p.s.i.g., preferably between about 45 p.s.i.g., and about 55 p.s.i.g., but most preferably as the reaction takes place in a closed vessel the system is allowed to reach its autogenous pressure. The reaction time is from about 2 to about 4 hours. The isomerization reaction is exothermic and can be carried out batchwise or continuously with the latter being preferred.

The chloridation step involves the reaction of the dialkyl alkyl phosphonate with phosgene. This reaction takes place at atmospheric pressure in the presence of a promoter such as dimethyl formamide or under increased pressure of from about 10 to about 100 p.s.i.g., and preferably about 80 to about 100 p.s.i.g. without the use of a promoter. The temperature used in this step of the process is from about 40° to about 60° C. and preferably from about 45° to about 55° C. It is preferred to react the dialkyl alkyl phosphonate with the phosgene in the chloridation step without the use of a promoter at elevated pressure. One of the advantages found in carrying out the chloridation step at increased pressure without the use of a promoter is an increased reaction rate with a decrease in the excess phosgene required for the reaction.

In the condensation step, the dialkyl-phosphono chloridate is preferably added to an excess of an alkali metal salt of a phenol, thiophenol or a substituted phenol or substituted thiophenol in the presence of a suitable solvent such as, e.g., toluene. In the practice of this invention, it has been found that the condensation reaction is dependent on the pH of the reactant mixture. The pH is preferably between about 12 and about 13 and most preferably between about 12.4 and about 12.6. If the reactant mixture becomes more acidic or more basic, the effect is a decrease in the yield of the condensation step. This step is carried out at atmospheric pressure and a temperature of between about 0° and about 25° C., but preferably between about 10° and about 15° C. The condensation reaction is preferably carried out with about a 5% to 10% excess of the alkali metal salt of a phenol, thiophenol or a substituted derivative thereof and with, for example, about 185 milliliters of toluene per gram mole of dialkylphosphono chloridate. The condensation step can be carried out batchwise or continuously with the latter being preferred.

It has also been found in the practice of this invention that the presence of nucleophilic or basic materials in the effluent from the condensation step is detrimental to the overall efficiency of the reaction. Washing of the effluent of the condensation step, in order to remove the nucleophilic and basic materials, is important to prevent the formation of degradation products by side reactions due to the presence of free base or sodium thiophenate. The phosphonic acid ester formed by the condensation step is passed to the final stage, that of thionation.

In the thionation step the phosphonic acid ester is reacted with phosphorus pentasulfide in the presence of a promoter selected from the group consisting of dimethyl, aniline, diammonium hydrogen phosphate, pyridine, picoline and aniline in a dilute toluene system. The reaction is carried out between about 90° and about 130° C. at atmospheric pressure and a residence time between about 5 and about 120 minutes. It is preferred to use diammonium hydrogen phosphate as recycle of the promoter is not required. It has been discovered that the diammonium hydrogen phosphate is most effective when used in a finely divided particulate form to reduce acidic concentrations. This reaction results in the desired thiono- or dithio-phosphonic acid ester.

Having thus generally described the method of producing thiono- or dithio-phosphonic acid, reference is now made to the following examples:

EXAMPLE I (A) Isomerization-triethylphosphite to diethylethyl phosphonate

Triethylphosphite is purified by vacuum fractional distillation. Three moles (575 g.) of triethylphosphite are charged to a one-liter type 316 stainless steel stirred autoclave. The autoclave is purged with nitrogen and 0.5 weight percent (2.87 g. of iodine is added. The autoclave is heated to 185° C. and periodically sampled via a dip tube to determine the extent of reaction by gas-liquid chromatograph analysis. The initial pressure at 185° C. is 30 p.s.i.g. As the reaction proceeds, the pressure slowly drops to 12 p.s.i.g. The reaction is complete in four hours. Gas-liquid chromatograph analysis indicates that the purity of the diethylethyl phosphonate formed is 99% pure.

(B) Chloridation

One mole (166.4 g.) of diethylethyl phosphonate from the isomerization step is charged to a 500 ml. round bottom flask equipped with an agitator, heating mantle, thermometer, subsurface inlet gas tube and off-gas rotameter. A cylinder of phosgene is mounted on a scale and is connected to the reactor inlet tube through a rotameter and trap. Eight and four-tenths grams of dimethylformamide are added to the reactor and the temperature is increased to about 45 to 50° C. A total of 110 g. (10% excess) of phosgene are added over a threee-hour period. The reactor is then held at about 45° to 50° C. for an additional two hours. The actual end point of the reaction is determined by gas-liquid chromatograph analysis of the chloridate. The off-gas is periodically analyzed with a thermal conductivity gas-liquid chromatograph to determine if phosgene is present in the off-gas.

(C) Condensation

Forty two grams (1.05 mole) of analytical reagent grade sodium hydroxide pellets are charged to a 500 ml. round bottom flask equipped with an agitator, thermometer and argon sweep inlet and outlet tubes. After the reactor is purged with argon, 128 ml. of water are added to dissolve the caustic, to make a 25% solution. Then 115.2 g. (1.05 mole) of thiophenol are added via a dropping funnel. The reaction is exothermic and the temperature is allowed to rise to 60° C., with the temperature being regulated by the thiophenol addition rate. After all of the thiophenol is added, the reaction is allowed to agitate an additional 15 minutes and then cooled to 30° C. Fifty ml. of toluene are then added and the reactor agitated for one minute. The reaction is carried out under an argon atmosphere throughout the operation.

The 1.05 moles of sodium thiophenate prepared above are separated from the toluene phase and charged to an argon purged one-liter glass reactor. This reactor is equipped with an agitator, thermometer, gas inlet and outlet tubes, two dropping funnels, pH electrodes and cooling bath. One hundred eigthy-five ml. of toluene are then charged to the reactor. One of the dropping funnels is charged with 25% caustic and the other with chloridate made with one mole of diethylethyl phosphonate using dimethylformamide as the catalyst.

Agitation is started and the reactor cooled to 15° C. The chloridate is added to the reactor over a period of 15 to 60 minutes, while controlling the pH at 12.5 by the addition of 25% caustic. On completion of the addition of chloridate, 50 ml. of water are added to the reactor to dissolve solid NaCl. The reaction mass is transferred to a separatory funnel and is diluted with 515 ml. of toluene. The lower salt phase is drawn off and discarded. The organic phase is washed two times with 300 ml. of 50° water.

The washed reaction mass is transferred to a two-liter round bottom glass reactor equipped with an agitator, thermometer, heating mantle, Dean-Stark trap and condenser. The temperature is raised to initial reflux (90° C.) and the reaction mass dehydrated azeotropically up to a pot temperature of approximately 118° C.

(D) Thionation

After the above dehydration, sixty grams (0.27 mole) of $P_2S_5$ are charged to the reaction mass resulting from the condensation step, followed immediately by 121 g. (1.0 mole) of N,N-dimethylaniline. The reactor is brought to reflux (118° C.) for one hour. Gas-liquid chromatograph analyses are run on the crude reaction mixture to determine if the reaction is complete. The reactor is cooled to 80° C. and 120 ml. of water are added, and the reactor is agitated for 15 minutes at 60° C. The reaction mixture is transferred to a separatory funnel and phase separated. The organic phase is returned to the reactor and 84 ml. (1.0 mole) of 38% HCl are added and the reactor is agitated for ten minutes. The HCl phase is separated and the organic phase is washed two times with 350 ml. of 50° C. water. The solvent is then stripped at a vacuum down to one mm. Hg., absolute at 90° C.

Yield of pure O-ethyl S-phenyl ethyl phosphonodithioate was 90%, based on diethylethyl phosphonate.

EXAMPLE II

In accordance with the method of Example I for the isomerization, chloridation and condensation steps, the resulting phosphonic acid ester thereby produced is subjected to the following thionation step. 174 grams of the phosphonic acid ester are dissolved in 70 mls. of toluene. To this is added 45 grams of $P_2S_5$ and 26.7 grams of ground dibasic ammonium hydrogen phosphate. The stirred mixture is heated to 100° C. for 90 minutes and is then quenched with 150 mls. of water. The mixture is refluxed with good agitation at 96° C. for one hour. The hot phases are separated with the dibasic ammonium hydrogen phosphate and $P_2S_5$ in the lower aqueous phase at a pH of about 1.8. The organic phase is refluxed for an additional hour with 150 mls. of fresh water. The phases are again separated while hot with the organic as the lower phase. Stripping the solvent yields the O-ethyl S-phenyl ethyl phosphonodithioate.

EXAMPLE III

Using diethylethyl phosphonate made by the isomerization method of Example I, the chloridation step is carried out as follows without the use dimethylformamide under increased pressure.

509 grams of diethylethyl phosphonate are added to a 2 liter autoclave reactor. The jacketed autoclave reactor is fitted with a glass sleeve, a stirrer, thermowell and sample dip tube. The latter three are made of 316 stainless steel. A reflux condenser is mounted on top of the unit to return condensible volatiles to the reactor. The condenser operated at about −40° C. The pressure in the reactor is controlled by means of a back pressure control valve. During the reaction the pressure in the reactor is controlled at 80 p.s.i.g. The reaction temperature is held between about 50° and about 55° C. throughout the run. The reaction rate is rapid in the beginning. This makes it necessary to control the water temperature in the jacket of the reactor so that it is held between about 25° and 35° C. As the reaction continued, the temperature of the water is gradually increased until it is virtually the same as the reaction temperature.

424 grams of phosgene are added during the first 114 minutes of the reaction. The reaction mass is agitated during the reaction. Samples of the product are withdrawn through the dip tube from time to time and analysed by gas chromatography to determine the diethylethyl phosphonate present.

The reaction is assumed complete after 6 hours and the temperature of the reactor is dropped to about 30° C. The reactor is slowly brought to atmospheric pressure over a period of two hours. A vacuum is then slowly pulled on the product. The vacuum is applied at the rate of about 1 p.s.i. per 5 minutes until the pressure reaches 50 mm. Hg and the temperature is maintained at 29° C. A total of 456 grams of crude chloridate are obtained.

EXAMPLE IV

Following the method of Example I but using trimethylphosphite in place of triethylphosphite O-methyl S-phenyl methyl dithio phosphonate is produced.

EXAMPLE V

Following the method of Example I but using triisopropyl phosphite in place of triethylphosphite O-isopropyl S-phenyl isopropyl dithio-phosphonate is produced.

Having thus described the invention, with reference to specific examples thereof, it is to be understood that other modification, alterations and applications will become apparent to those skilled in the art without departing from the scope of the present invention and that the present invention is limited only as defied in the claims appended hereto.

We claim:

1. A process for the production of

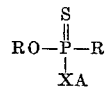

wherein R is alkyl containing 1 through 6 carbon atoms, X is a member selected from the group consisting of oxygen and sulfur, and A is selected from the group consisting of phenyl and substituted phenyl, wherein the substituents are selected from the group consisting of chlorine, lower alkyl, lower alkoxy, nitro and cyano, comprising reacting a compound having the formula

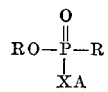

wherein R, X, and A have the previously indicated meaning, with phosphorus pentasulfide in an organic system at a temperature of from about 90° C. to about 130° C. in the presence of a promoter selected from the group comprising dimethyl aniline, aniline, 2-picoline, 3-picoline, 4-picoline, pyridine, and diammonium hydrogen phosphate.

2. The process of claim 1 wherein the pressure is atmospheric.

3. The process of claim 2 wherein R is $C_2H_5$, X is sulfur, A is phenyl, and the temptrature is between about 100° C. to about 120° C.

4. The method of claim 3 wherein the promoter is diammonium hydrogen phosphate.

5. The method of claim 3 wherein the promoter is dimethyl aniline.

References Cited

UNITED STATES PATENTS

| | | | |
|---|---|---|---|
| 2,596,679 | 5/1952 | Hagemeyer | 260—969 X |
| 3,032,580 | 5/1962 | Schrader | 260—972 X |
| 3,092,651 | 6/1963 | Friedman | 260—969 X |
| 3,167,574 | 1/1965 | Brown et al. | 260—986 |
| 3,356,771 | 12/1967 | Scheuerer et al. | 260—986 X |

OTHER REFERENCES

Houben-Weyl, Methoden Der Organischen Chemie, vol. 12/2, Organische Phosphorverbin Dungen, part I pp. 331 and 332, and Part II, pp. 592, 593, 616 and 644 (1963 and 1964).

Kosolapoff, Organophosphorus Compounds, 1950, pp. 121 and 122.

JOSEPH REBOLD, Primary Examiner

R. L. RAYMOND, Assistant Examiner

U.S. Cl. X.R.

260—940, 951, 961, 969, 973, 986, 989